United States Patent Office 3,236,868
Patented Feb. 22, 1966

3,236,868
9α,11β - DICHLORO - 17α - ACYLOXY - Δ$^{4,6}$ - PREGNADIENE-3,20-DIONES AND CORRESPONDING 1-DEHYDRO DERIVATIVES
Albert Bowers, Mexico City, Mexico, assignor, by mesne assignments, to Syntex Corporation, a corporation of Panama
No Drawing. Filed Jan. 31, 1961, Ser. No. 85,974
Claims priority, application Mexico, Feb. 18, 1959, 53,717; Oct. 29, 1959, 56,285
12 Claims. (Cl. 260—397.45)

This application is a continuation-in-part of application Serial No. 9,435, filed February 18, 1960.

The present invention relates to novel cyclopentanophenanthrene compounds and to a novel process for the preparation thereof.

More particularly the present invention relates to 9α,11β - dichloro - 17α - acyloxy - Δ$^4$-pregnene-3,20-diones which may contain a halogen or methyl group at C–6 and further unsaturation at C–1,2 and/or C–6,7.

The novel compounds of the present invention which are potent progestational agents exhibiting anti-androgenic and anti-estrogenic activity are represented by the following formulas:

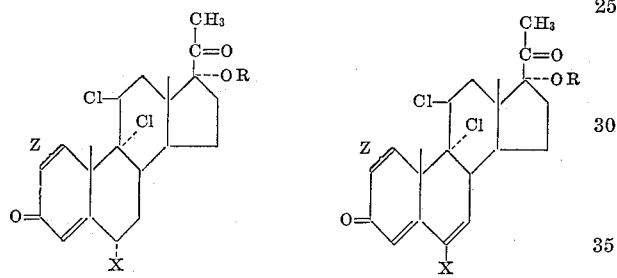

In the above formulas X represents hydrogen, methyl, chlorine, fluorine or bromine; Z indicates a double bond or a saturated linkage between C–1 and C–2 and R represents an acyl group derived from a hydrocarbon carboxylic acid of less than 12 carbon atoms, saturated or unsaturated, of straight, branched, cyclic or cyclic-aliphatic chain, aromatic and may be substituted by functional groups such as hydroxy, acyloxy, alkoxy, amino, nitro or halogen. Typical ester groups are the acetate, propionate, butyrate, caproate, enanthate, trimethylacetate, t - butylacetate, phenoxyacetate, cyclopentylpropionate, aminoacetate and β-chloropropionate.

The novel compounds of the present invention unsubstituted at C–6 may be prepared by a process illustrated by the following equation:

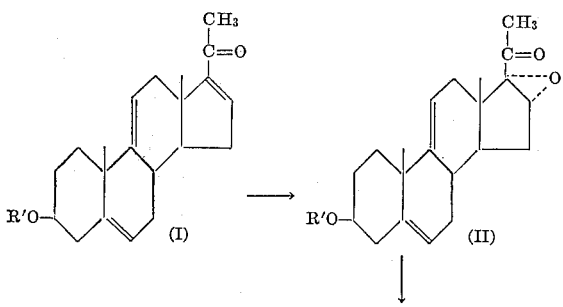

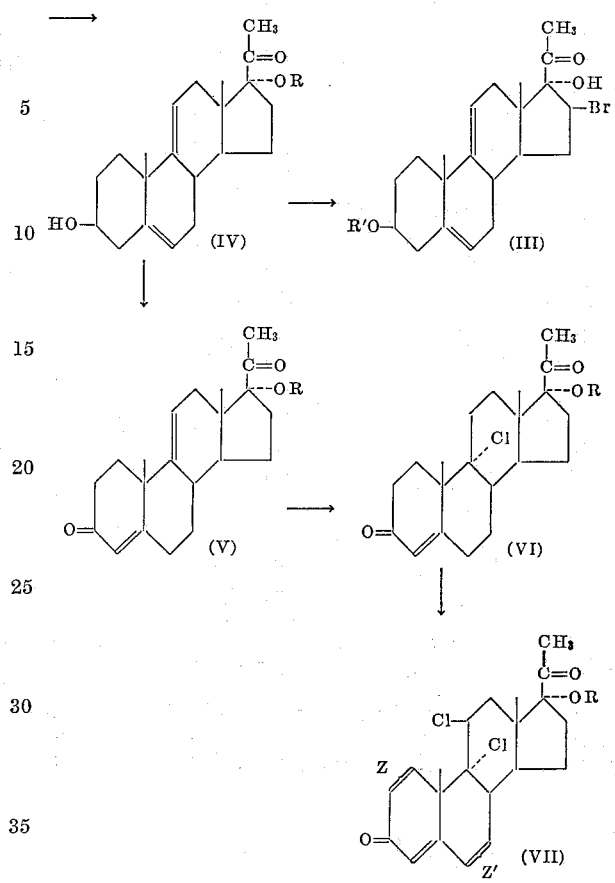

In the above equation Z and R have the same meaning as previously set forth; Z' indicates a double bond between C–6 and C–7 and R' represents the acyl group of a hydrocarbon carboxylic acid of less than 12 carbon atoms and preferably represents the acetyl group.

In practicing the process outlined above, Δ$^{5,9(11),16}$-pregnatrien-3β-ol-20-one, disclosed by A. Bowers, J. Am. Chem. Soc. 81, 4107 (1959), is acetylated by conventional methods to form the starting compound, 3β-acetoxy-Δ$^{5,9(11),16}$-pregnatrien-20-one (I). Upon selective epoxidation as by reaction of the latter compound with hydrogen peroxide under alkaline conditions, followed by reacetylation at C–3, there is formed the 3β-acetoxy-16α,17α-oxido-Δ$^{5,9(11)}$-pregnadien-20-one (II). The oxido ring is then opened by treatment with hydrogen bromide to afford the bromohydrin (III) in which the bromine is reductively eliminated as by refluxing the bromohydrin with Raney nickel to thus give 3β-acetoxy-Δ$^{5,9(11)}$-pregnadien-17α-ol-20-one; the tertiary hydroxyl group is then esterified with a hydrocarbon carboxylic acid anhydride of the type mentioned previously in benzene solution and in the presence of p-toluenesulfonic acid. The acetoxy group at C–3 is selectively hydrolyzed and there is formed Δ$^{5,9,(11)}$-pregnadien-3β,17α-diol-20-one-17 - acylate (IV) which upon oxidation under Oppenauer conditions is transformed into 17α-acyloxy-Δ$^{4,9(11)}$-pregnadien-3,20 - dione (V). Upon subsequent reaction with a molar equivalent of chlorine in an inert solvent such as lower aliphatic acids, as for example, acetic or propionic acid or lower aliphatic halogenated hydrocarbon such as chloroform or carbon tetrachloride or other solvents such as dimethylformamide or dimethylacetamide at a temperature between room temperature and −30° C., there is formed the 9α,11β-dichloro-17α-acylox-Δ4-pregnene-3,20 - dione (VI). Alternatively the 9(11)-dehydro-17α-acyloxyprogesterone (V) can be chlorinated by dissolving the steroid in methylene chloride and generating chlorine by the reaction of N-chlorosuccinimide with dry hydrogen chloride, ending the reaction at a temperature of about 0° C.

A double bond can then be introduced at C–1,2 by refluxing the 9α,11β-dichloro-17α-acyloxy-progesterone (VI) with selenium dioxide in a solvent such as t-butanol in the presence of pyridine to form 9α,11β-dichloro-17α-acyloxy-Δ1,4-pregnadiene-3,20-dione (VI:Z=double bond; Z'=saturated linkage). For introduction of a double bond at C–6,7, the latter compound or 9α,11β-dichloro-17α-acyloxy-progesterone (VI) is refluxed with a quinone such as chloranil in a mixture of ethyl acetate and acetic acid or in t-butanol to thus form 9α,11β-dichloro-Δ1,4,6-pregnatrien-17α-ol - 3,20 - dione acylate (VII:Z=Z'=double bond) or 9α,11β-dichloro-Δ4,6-pregnadien-17α - ol - 3,20-dione acylate (VII:Z=saturated linkage; Z'=double bond). The last named compound can be subjected to the treatment with selenium dioxide to introduce an additional double bond at C–1,2 to thus form 9α,11β-dichloro-Δ1,4,6-pregnatrien-17α-ol-3,20-dione acylate (VII:Z=Z'=double bond)

The double bond at C–1,2 can also be introduced prior to the chlorination step and may be introduced by incubation with *Corynebacterium simplex* ATCC 6946 or SeO$_2$ as described above.

In another aspect of the present invention by first esterifying 17α-hydroxy-9-dehydro-progesterone [Fried et al., J. Am. Chem. Soc. 77, 1068 (1956)], followed by the addition of chlorine as described above, there may be prepared the novel compounds of the present invention unsubstituted at C–6.

The production of the novel compounds of the present invention having a halogen substituent at C–6 may be prepared by a process illustrated by the following equation:

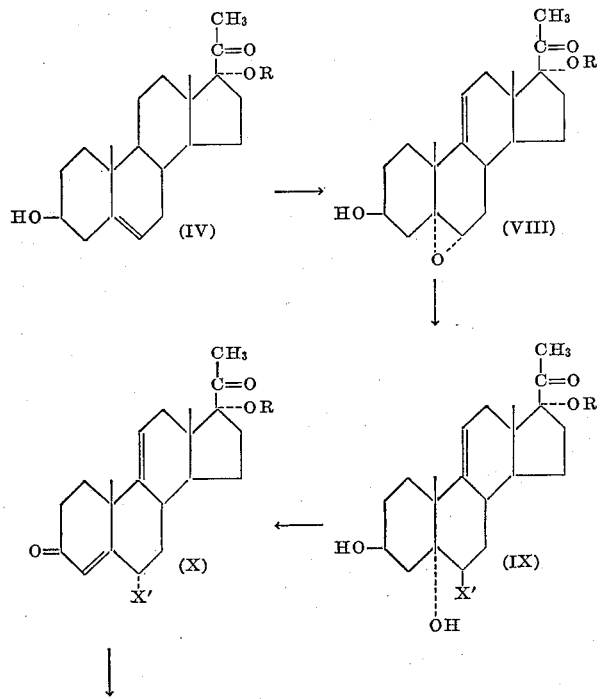

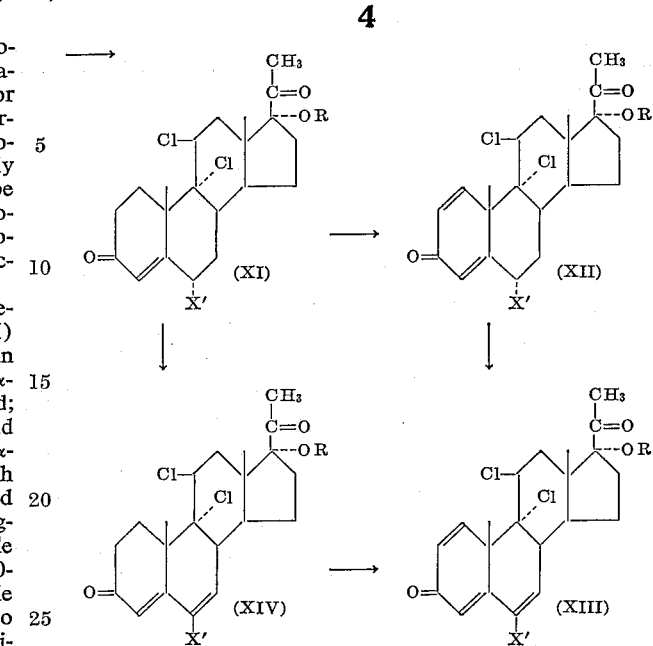

In the above equation X' represents a halogen such as fluorine, chlorine or bromine and R has the same meaning as set forth previously.

In practicing the process outlined above, Δ5,9(11)-pregnadiene-3β,17α-diol-20-one-17 - acylate (IV) is reacted with 1.1 molar equivalents of a peracid such as monoperphthalic acid to form the 5α,6α-oxido-Δ9(11)-pregnene-3β,17α-diol-20-one-17-acylate (VIII). The oxide ring is then opened by reaction with fluoroboric acid as described in copending U.S. application 26,703, filed May 4, 1960, or dry hydrogen chloride or hydrogen bromide and the resulting halohydrin (IX) is oxidized with 8 N chromic acid followed by subsequent treatment with a mineral acid to thus form the respective 6α-halo-9-dehydro-17α-acyloxy-progesterone (X). Upon reaction with chlorine as described previously there is formed the 6α-halo-9α,11β-dichloro-17α-acyloxy-progesterone (XI).

A double bond is introduced at C–1,2 by reaction with selenium dioxide or at C–6,7 by reaction with chloranil as set forth above to form 6α-halo-9α,11β-dichloro-17α-acyloxy-Δ1,4-pregnadiene-3,20-dione (XII) or 6α-halo-9α,11β-dichloro-17-acyloxy-Δ4,6-pregnadiene - 3,20 - dione (XIII) respectively. By combining the methods of dehydrogenation there is formed 6α-halo-9α-,11β-dichloro-17α-acyloxy-Δ1,4,6-pregnatriene-3,20-dione (XIV).

The preparation of the novel compounds of the present invention having a methyl group at C–6 can be illustrated by the following equation:

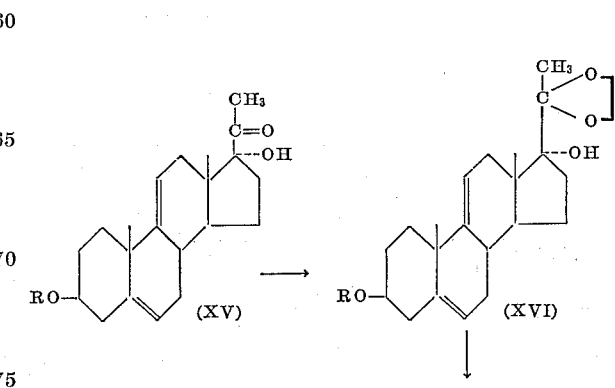

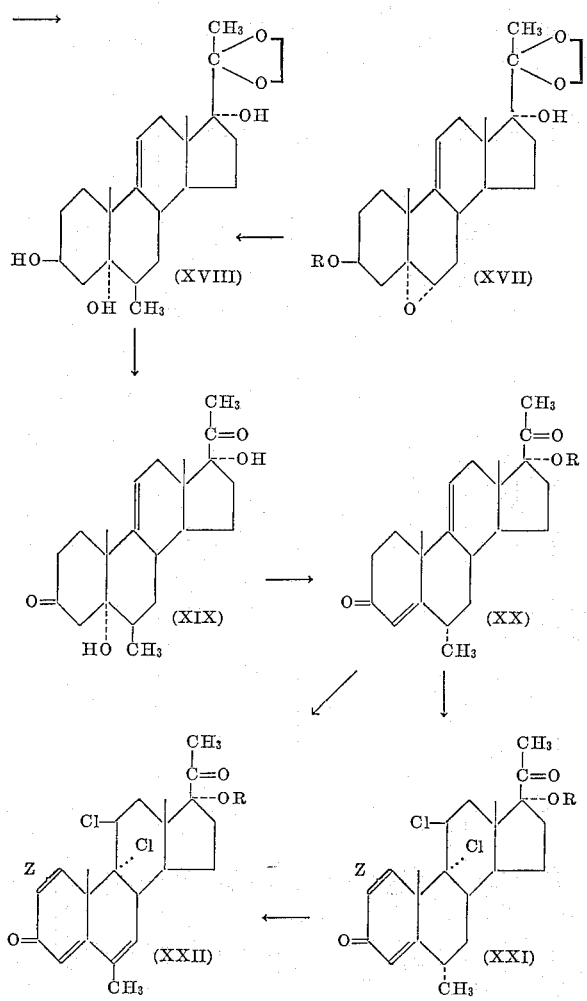

In the above equation, Z and R have the same meaning as previously set forth.

In practicing the process outlined above, 3β-acyloxy-Δ$^{5,9(11)}$-pregnadien-17α-ol-20-one (XV) is reacted with ethylene glycol in benzene solution in the presence of p-toluenesulfonic acid to form the 20-cyclic ethylenedioxy-Δ$^{5,9(11)}$-pregnadiene-3β,17α-diol-3-acylate (XVI). The double bond at C–5,6 is then selectively epoxidized by reaction with 1.1 molar equivalents of monoperphthalic acid to form 20-ethylenedioxy-5α,6α-oxido-Δ$^{9(11)}$-pregnene-3β,17α-diol-3-acylate (XVII). For introduction of the methyl group at C–6, the latter compound is refluxed with methyl magnesium bromide in a solvent such as benzene to form with simultaneous conversion of the acyloxy group to the hydroxyl group, 6β-methyl-20-ethylenedioxy-Δ$^{9(11)}$-pregnene-3β,5α,17α-triol (XVIII). The ketal group is removed by hydrolysis as by reaction with a catalytic amount of p-toluene sulfonic acid in moist acetone at room temperature and upon subsequent oxidation with chromic acid there is formed 6β-methyl-Δ$^{9(11)}$-pregnene-5α,17α-diol-3,20-dione (XIX) which is treated with a mineral acid to effect dehydration of C–5 with concurrent inversion of the steric configuration at C–6 thus affording 6α-methyl-Δ$^{9(11)}$-pregnen-17α-ol-3,20-dione. By acylation with a hydrocarbon carboxylic acid anhydride of less than 12 carbon atoms in the presence of p-toluenesulfonic acid and in benzene solution there is obtained 6α-methyl-17α-acyloxy-9(11)-dehydro-progesterone (XX) which is in turn treated with chlorine to form 6α-methyl-9α,11β-dichloro-17α-acyloxyprogesterone (XXI: Z=saturated linkage). Double bonds may then be introduced at C–1,2 and/or at C–6,7 as described previously to form 6α-methyl-9α,11β-dichloro-17α-acyloxy-1-dehydro-progesterone (XXI: Z=double bond), 6-methyl-9α,11β-dichloro-17α-acyloxy-6-dehydro-progesterone (XXII: Z=saturated linkage) and 6-methyl-9α,11β-dichloro-17α-acyloxy-1,6-bis-dehydro-progesterone (XXII: Z=double bond).

The following examples serve to illustrate but are not intended to limit the scope of the invention:

Example I 20 g. of Δ$^{5,9(11),16}$-pregnatrien-3β-ol-20-one [Bowers, J. Am. Chem. Soc. 81, 4107 (1959)], was mixed with 20 cc. of acetic anhydride in 80 cc. of pyridine and allowed to remain for 3 hours at room temperature; the mixture was diluted with water, the precipitate collected by filtration, dried and purified by recrystallization from acetone-hexane thus yielding the 3-acetate of Δ$^{5,9(11),16}$-pregnatrien-3β-ol-20-one.

A solution of 12 g. of the acetate of Δ$^{5,9(11),16}$-pregnatrien-3β-ol-20-one in 800 cc. of methanol was cooled to 15° C. and treated at this temperature with 24 cc. of 4 N sodium hydroxide solution and 36 cc. of 30% hydrogen peroxide, adding the reagents simultaneously, little by little and with stirring. The mixture was then kept at 5° C. overnight, poured into 3,200 cc. of ice water and the solid was collected by filtration, washed with water, dried and then treated with 12 cc. of acetic anhydride and 60 cc. of pyridine, overnight at room temperature. After pouring into water the mixture was heated for half an hour on the steam bath, cooled and the solid was collected, washed with water, dried and recrystallized from methanol, thus giving the acetate of 16α,17α-oxido-Δ$^{5,9(11)}$-pregnadien-3β-ol-20-one.

To a stirred solution of 12 g. of the above compound in 140 cc. of glacial acetic acid was added at room temperature 17.2 cc. of glacial acetic acid saturated with dry hydrogen bromide. After stirring for half an hour further at room temperature the mixture was poured into water and the precipitate was collected, and washed with water to neutral. There was thus obtained the 3-acetate of 16β-bromo-Δ$^{5,9(11)}$-pregnadiene-3β,17α-diol-20-one in crude form.

The above bromohydrin, still wet, was refluxed with 80 g. of Raney nickel in 600 cc. of 95% ethanol for 5 hours, at the end of which the hot solution was filtered through celite; the filtrate was concentrated under reduced pressure until crystallization started; after cooling the precipitate was collected by filtration. Recrystallization from acetone furnished the 3-acetate of Δ$^{5,9(11)}$-pregnadiene-3β,17α-diol-20-one.

A mixture of 8 g. of the above compound, 160 cc. of acetic acid, 80 cc. of acetic anhydried and 8 g. of p-toluenesulfonic acid was kept overnight at room temperature and then poured into ice water. The precipitate was collected, washed with water and dried. There was thus obtained the diacetate of Δ$^{5,9(11)}$-pregnadiene-3β,17α-diol-20-one, which was used for the next step without further purification.

The above diacetate was dissolved in 400 cc. of 1% methanolic potassium hydroxide solution and kept for 4 hours at 5° C.; it was then acidified with acetic acid, concentrated under reduced pressure to about 40 cc. and diluted with ice water to precipitate the product, namely the 17-acetate of Δ$^{5,9(11)}$-pregnadiene-3β,17α-diol-20-one, which was purified by recrystallization from methanol.

To a cooled solution of 3.5 g. of the above compound in 70 cc. of chloroform was added an ether solution of monoperphthalic acid containing 1.1 molar equivalents of peracid and the mixture was kept overnight in the dark at 5° C. It was then diluted with water and the organic layer was separated, washed with saturated aqueous sodium bicarbonate solution and water, dried over anhydrous sodium sulfate and the solvent was evaporated. Chromatography of the residue on neutral alumina afforded the 17-acetate of 5α,6α-oxido-Δ$^{9(11)}$-pregnene-3β,17α-diol-20-one.

Example II

To a solution of 2.5 g. of 5α,6α-oxido-Δ$^{9(11)}$-pregnene-3β,17α-diol-20-one-17-monoacetate in 125 cc. of ether and 125 cc. of benzene was added 2.5 cc. of recently distilled boron trifluoride etherate and the mixture was kept at room temperature overnight. It was then diluted with water, the organic layer was separated and washed several times with water, dried over anhydrous sodium sulfate and evaporated to dryness under reduced pressure. The residue was chromatographed on neutral alumina and the crystalline fractions were recrystallized from acetone-hexane. There was thus obtained the 17-acetate of 6β-fluoro-Δ$^{9(11)}$-pregnene-3β,5α,17α-triol-20-one.

A stirred solution of 2 g. of the above compound in 200 cc. of acetone was cooled to 0° C., flushed with nitrogen and treated dropwise with an 8 N solution of chromic acid, until the color of chromium trioxide persisted in the mixture. (The 8 N solution of chromic acid had been prepared by dissolving 26.7 g. of chromium trioxide in 23 cc. of concentrated sulfuric acid and diluting with distilled water to 100 cc.). The mixture was stirred for 5 minutes further at 0° C., then diluted with ice water and the precipitate was collected, washed with water and dried, thus producing the 17-monoacetate of 6β-fluoro-Δ$^{9(11)}$-pregnene-5α,17α-diol-3,20-dione.

The above crude product was dissolved in 100 cc. of glacial acetic acid and treated with a stream of dry hydrogen chloride at 15° C. during 2 hours. It was then poured into ice water, the precipitate was collected, washed with water, dried and recrystallized from acetone ether affording 6α-fluoro-9(11)-dehydro-17α-acetoxy progesterone.

A solution of 2 g. of the above compound in 50 cc. of carbon tetrachloride was cooled to 5° C. and treated with 20 cc. of a solution of chlorine in carbon tetrachloride containing 1.05 molar equivalents of chlorine. The mixture was kept for 2 minutes at 5–10° C., then poured into ice water containing 5 g. of sodium carbonate and exhaustively extracted with carbon tetrachloride. The extract was washed with water to neutral, dried over anhydrous sodium sulfate and the solvent was evaporated; recrystallization of the residue from acetone-hexane furnished 6α-fluoro-9α-11β-dichloro - 17α-acetoxy-progesterone.

Example III

A mixture of 2 g. of the 17-acetate of 5α,6α-oxido-Δ$^{9(11)}$-pregnene-3β,17α-diol-20-one and 50 cc. of glacial acetic acid was treated with a stream of dry hydrogen chloride at 15° C. during 4 hours. The resulting yellow solution was poured into ice water, the precipitate was collected, washed with water, dried and recrystallized from methylene chloride-ether thus producing the 17-acetate of 6β-chloro-Δ$^{9(11)}$ - pregnene-3β,5α,17α-triol-20-one, which in turn was oxidized by the method of the preceding example, to produce the 17-acetate of 6β-chloro-Δ$^{9(11)}$-pregnene-5α,17α-diol-3,20-dione; after dehydrating by reaction with dry hydrogen chloride in glacial acetic acid there was obtained 6α-chloro-9(11)-dehydro-17α-acetoxyprogesterone.

1 g. of the above compound was treated with chlorine in carbon tetrachloride in accordance with the method described in Example II, to give 6α,9α,11β-trichloro-17α-acetoxyprogesterone.

Example IV

A mixture of 1 g. of 6α-fluoro-9α,11β-dichloro-17α-acetoxyprogesterone, described in Example II, 300 mg. of selenium dioxide, 50 cc. of t-butanol and a few drops of pyridine was refluxed under an atmosphere of nitrogen for 48 hours. It was then filtered through celite, the filter was washed with a little hot ethyl acetate, the filtrate and washings were combined and the solvent was evaporated under reduced pressure; the residue was purified by chromatography on silica gel, thus yielding 6α-fluoro-9α,11β-dichloro-1-dehydro-17α-acetoxyprogesterone.

Example V

In accordance with the dehydrogenation method described in the previous example, 6α,9α,11β-trichloro-17α-acetoxy-progesterone was coverted into 6α,9α,11β-trichloro-1-dehydro-17α-acetoxy-progesterone.

Example VI

A mixture of 3 g. of 6α-methyl-Δ$^{4,9(11)}$-pregnadien-17α-ol-3,20-dione, described in U.S. Patent 2,867,633, 120 cc. of glacial acetic acid, 60 cc. of acetic anhydride and 3 g. of p-toluenesulfonic acid was kept for 2 hours at room temperature and then poured into water; the reaction mixture was heated on the steam bath for half an hour, cooled and the precipitate was collected, washed with water, dried and chromatographed on neutral alumina. There was thus obtained 6α-methyl-Δ$^{4,9(11)}$-pregnadien-17α-ol-3,20-dione acetate.

By following the chlorination method of Example I, 1 g. of the above compound was converted into 6α-methyl-9α,11β-dichloro-Δ$^4$-pregnen - 17α-ol-3,20 - dione acetate, i.e. 6α-methyl-9α,11β-dichloro-17α-acetoxy progesterone. Selenium dioxide oxidation of this compound in accordance with the method of Example IV, gave 6α-methyl-9α,11β-dichloro-Δ$^{1,4}$ - pregnadien-17α-ol-3,20-dione acetate.

Example VII

A small amount of solvent was distilled from a mixture of 6 g. of the 17-acetate of Δ$^{5,9(11)}$-pregnadiene-3β,17α-diol-20-one (described in Example I), 420 cc. of toluene and 60 cc. of cyclohexanone until the traces of moisture were removed by azeotropic distillation. There was then added 2.6 g. of aluminum isopropylate dissolved in 40 cc. of dry toluene, in the course of 5 minutes; it was then refluxed for 1 hour at the end of which the volatile solvents were removed by steam distillation. After cooling the product was extracted with ether, the extract was successively washed with 1% sulfuric acid, 1% sodium hydroxide and water, dried over anhydrous sodium sulfate and evaporated. Crystallization of the residue from acetone-hexane afforded 9(11)-dehydro-17α-acetoxyprogesterone.

Example VIII

The conversion of the above compound into 9α-11β-dichloro-17α-acetoxyprogesterone was carried out with the same result by the following procedures:

(a) A solution of 2 g. of 9(11)-dehydro-17α-acetoxyprogesterone in 50 cc. of carbon tetrachloride was cooled to 5° C. and treated with 20 cc. of a solution of chlorine in carbon tetrachloride containing 1.05 molar equivalents of chlorine. The mixture was kept for 2 minutes at 5–10° C., then poured into ice water containing 5 g. of sodium carbonate and exhaustively extracted with carbon tetrachloride. The extract was washed with water to neutral, dried over anhydrous sodium sulfate and the solvent was evaporated; recrystallization of the residue from acetone-hexane furnished 9α,11β-dichloro-17α-acetoxyprogesterone.

(b) A solution of 2 g. of 9(11)-dehydro-17α-acetoxyprogesterone in 50 cc. of methylene chloride was mixed with 1.1 molar equivalents of N-chlorosuccinimide and cooled to −80° C. A slow stream of dry hydrogen chloride was then introduced into the solution of −80° C. for approximately 15 minutes, then warmed to 0° C. and kept at this temperature for 2 hours. The product was then isolated as described in procedure (a) to produce 9α,11β-dichloro-17α-acetoxyprogesterone having identical properties to those of the compound obtained by that method.

Example IX

In accordance with the method described in Example I, there was prepared 3 g. of the 3-acetate of Δ$^{5,9(11)}$-pregnadiene-3β,17α-diol-20-one, which was then refluxed with 28 cc. of ethylene glycol, 270 cc. of benzene and 2.3 g.

of p-toluenesulfonic acid monohydrate, for 18 hours and with the use of a water separator. The solution was then washed with 5% aqueous sodium carbonate solution and with water to neutral, dried over anhydrous sodium sulfate and the benzene was evaporated. The residue consisted of the 3-acetate of 20-ethylenedioxy-$\Delta^{5,9(11)}$-pregnadiene-3$\beta$,17$\alpha$-diol in crude form which was then treated with 1.1 molar equivalents of monoperphthalic acid, as described in Example I; the crude product was chromatographed on neutral alumina, thus giving the 3-acetate of 5$\alpha$,6$\alpha$-oxido-20-ethylenedioxy-$\Delta^{9(11)}$-pregnene - 3$\beta$,17$\alpha$-diol.

A mixture of 1.5 g. of the above compound, 55 cc. of anhydrous benzene and 12.5 cc. of a 3 N ether solution of methyl magnesium bromide was refluxed for 6 hours, at the end of which it was poured into a mixture of 200 cc. of water, 200 g. of ice and 15 g. of ammonium chloride, stirring vigorously. The benzene layer was then separated, washed with dilute hydrochloric acid and water to neutral, dried over anhydrous sodium sulfate and the solvent was evaporated; the residue was treated with 100 cc. of acetone, 2 cc. of water and 500 mg. of p-toluenesulfonic acid and kept overnight at room temperature. Upon dilution with water, filtration of the solid and recrystallization from acetone-hexane there was obtained 6$\beta$-methyl-$\Delta^{9(11)}$-pregnene-3$\beta$,5$\alpha$,17$\alpha$-triol-20-one.

Exactly as described in Example II, the 3$\beta$-hydroxy group was then oxidized by reaction with 8 N chromic acid and the resulting 6$\beta$-methyl-$\Delta^{9(11)}$-pregnene-5$\alpha$-17$\alpha$-diol-3,20-dione was dehydrated to 6$\alpha$-methyl-9(11)-dehydro-17$\alpha$-hydroxyprogesterone. There was then applied the method of acetylation with acetic anhydride in acetic acid in the presence of p-toluenesulfonic acid, also as described in Example I. There was thus obtained 6$\alpha$-methyl-9(11)-dehydro-17$\alpha$-acetoxyprogesterone.

1 g. of the above compound was treated with chloride by the method (described in Example VIII, procedure b) to give 6$\alpha$ - methyl - 9$\alpha$,11$\beta$ - dichloro-17$\alpha$-acetoxyprogesterone identical with the product obtained in Example VI.

*Example X*

A mixture of 1 g. of 9$\alpha$,11$\beta$-dichloro-17$\alpha$-acetoxyprogesterone (Example VIII), 300 mg. of selenium dioxide, 50 cc. of t-butanol and a few drops of pyridine was refluxed under an atmosphere of nitrogen for 48 hours. It was then filtered through celite, the filter was washed with a little hot ethyl acetate, the filtrate and washings were combined and the solvent was evaporated under reduced pressure; the residue was purified by chromatography on silica gel, thus yielding 9$\alpha$,11$\beta$-dichloro-1-dehydro-17$\alpha$-acetoxyprogesterone.

A mixture of 500 mg. of the above compound, 1 g. of chloranil, 7.5 cc. of ethyl acetate and 1 cc. of glacial acetic acid was refluxed under an atmosphere of nitrogen for 55 hours at the end of which there was added 20 cc. more of ethyl acetate, the mixture was washed with cold 5% sodium hydroxide solution until the washings were colorless, then with water, dried over anhydrous sodium sulfate and the organic solvent was evaporated under reduced pressure. The residue was chromatographed on neutral alumina, thus affording 9$\alpha$,11$\beta$-dichloro-1,6-bis-dehydro-17$\alpha$-acetoxyprogesterone.

*Example XI*

There was inverted the order of the dehydrogenations described in the preceding example; by the reaction with chloranil, there was obtained 9$\alpha$,11$\beta$-dichloro-6-dehydro-17$\alpha$-acetoxyprogesterone; by reaction of the latter with selenium dioxide there was produced 9$\alpha$,11$\beta$-dichloro-1,6-bis-dehydro-17$\alpha$-acetoxyprogesterone, identical with the final compound of the preceding example.

*Example XII*

By following the methods described in Examples X and XI, 6$\alpha$-fluoro-9$\alpha$,11$\beta$-dichloro-17$\alpha$-acetoxyprogesterone described in Example II was converted into 6-fluoro-9$\alpha$,11$\beta$-dichloro-6-dehydro-17$\alpha$-acetoxyprogesterone.

*Example XIII*

By following the methods described in Examples X and XI, 6$\alpha$,9$\alpha$,11$\beta$-trichloro-17$\alpha$-acetoxyprogesterone of Example III was converted into 6$\alpha$,9$\alpha$,11$\beta$-trichloro-1-dehydro-17$\alpha$-acetoxyprogesterone (identical with the product of Example V), 6,9$\alpha$,11$\beta$-trichloro-1,6-bisdehydro-17$\alpha$-acetoxyprogesterone and 6,9$\alpha$,11$\beta$-trichloro-6-dehydro-17$\alpha$-acetoxyprogesterone.

*Example XIV*

By following the method described in Example III except that the dry hydrogen chloride was substituted by dry hydrogen bromide, there formed in stepwise manner the 17-acetate of 6$\beta$-bromo-$\Delta^{9(11)}$-pregnene-3$\beta$,5$\alpha$,17$\alpha$-triol-20-one, the 17-acetate of 6$\beta$-bromo-$\Delta^{9(11)}$-pregnene-5$\alpha$,17$\alpha$-diol-3,20-dione, 6$\alpha$-bromo-9(11)-dehydro-17$\alpha$-acetoxyprogesterone and 6$\alpha$-bromo-9$\alpha$,11$\beta$-dichloro-17$\alpha$-acetoxyprogesterone.

By applying the methods of dehydrogenation described in Examples X and XI, the above compound was transformed into 6$\alpha$-bromo-9$\alpha$,11$\beta$-dichloro-1-dehydro-17$\alpha$-acetoxyprogesterone, 6-bromo-9$\alpha$,11$\beta$-dichloro-1,6-bis-dehydro-17$\alpha$-actoxyprogesterone and 6-bromo-9$\alpha$,11$\beta$-dichloro-6-dehydro-17$\alpha$-acetoxyprogesterone.

*Example XV*

By applying the methods of Examples X and XI to 6$\alpha$-methyl - 9$\alpha$,11$\beta$ - dichloro-17$\alpha$-acetoxyprogesterone there were formed 6$\alpha$-methyl-9$\alpha$,11$\beta$-dichloro-1-dehydro-17$\alpha$-acetoxyprogesterone, 6-methyl-9$\alpha$,11$\beta$-dichloro-1,6-bisdehydro-17$\alpha$-acetoxy-progesterone and 6-methyl-9$\alpha$,11$\beta$-dichloro-6-dehydro-17$\alpha$-acetoxyprogesterone.

*Example XVI*

In accordance with the method described in Example I there was prepared 3 g. of the 3-acetate of $\Delta^{5,9(11)}$-pregnadiene-3$\beta$,17$\alpha$-diol-20-one which was dissolved in 100 cc. of anhydrous benzene, treated with 4 cc. of propionic anhydride and 500 mg. of p-toluenesulfonic acid and the mixture was kept overnight at room temperature. The benzene solution was then washed with 5% aqueous sodium carbonate solution and then with water, dried over anhydrous sodium sulfate and the solvent was evaporated There was thus obtained the crude-3-acetate-17-propionate of $\Delta^{5,9(11)}$-pregnadiene-3$\beta$,17$\alpha$-diol-20-one which was next treated with methanolic potassium hydroxide solution, as described in Example I, to produce the 17-propionate of $\Delta^{5,9(11)}$-pregnadiene-3$\beta$,17$\alpha$-diol-20-one. Upon subsequent Oppenauer oxidation there was produced the propionate of 17$\alpha$-hydroxy-9(11)-dehydroprogesterone, and treatment of the latter with chlorine afforded 9$\alpha$,11$\beta$-dichloro-17$\alpha$-propionoxyprogesterone.

*Example XVII*

In the method of the preceding example there was employed hexanoic anhydride (6 g.) instead of propionic anhydride, and the mixture was allowed to react for 48 hours at room temperature. There was thus obtained the respective intermediates having the capronoxy group at C-17$\alpha$ and finally there was obtained the caproate of 9$\alpha$,11$\beta$-dichloro-17$\alpha$-hydroxyprogesterone.

*Example XVIII*

In accordance with the method of Example II, there was transformed the 17-propionate of $\Delta^{5,9(11)}$-pregnadiene-3$\beta$,17$\alpha$-diol-20-one (Example XVI) into the propionate of 6$\alpha$ - fluoro-9$\alpha$,11$\beta$-dichloro-17$\alpha$-hydroxyprogesterone; by appyling the method of Example III, there was obtained the propionate of 6$\alpha$,9$\alpha$,11$\beta$-trichloro-17$\alpha$-hydroxyprogesterone; in accordance with the method of Example XIV there was obtained the propionate of 6$\alpha$-bromo-9$\alpha$,11$\beta$-dichloro-17$\alpha$-hydroxyprogesterone.

Example XIX

In accordance with the method of the preceding example, from the 17-hexanoate of Δ5,9(11)-pregnadiene-3β,17α-diol-20-one (Example XVII), there were finally obtained the hexanoates of 6α-fluoro-9α,11β-dichloro-17β-hydroxyprogesterone, of 6α,9α,11β-trichloro-17α-hydroxyprogesterone, and of 6α-bromo-9α,11β-dichloro-17α-hydroxyprogesterone.

Example XX

By applying the esterification described in Examples XVI and XVII to 6α-methyl-9(11)-dehydro-17α-hydroxygesterone (Example VI) there were formed its propionate and hexanoate, respectively, and upon subsequent reaction with chlorine there were obtained the propionates and hexanoates of 6α-methyl-9α,11β-dichloro-17α-hydroxyprogesterone.

Example XXI

By applying the dehydrogenations described in Examples X and XI to the final compounds of Examples XVI through XX there were prepared the propionates and hexanoates of the 9α,11β-dichloroderivates of 1-dehydro-17α-hydroxyprogesterone, 6α-fluoro-1-dehydro-17α-hydroxyprogesterone, 6α-chloro-1-dehydro-17α-hydroxyprogesterone, 6α-bromo-1-dehydro-17α-hydroxyprogesterone, 6α-methyl-1-dehydro-17α-hydroxyprogesterone, 6-dehydro-17α-hydroxyprogesterone, 6-fluoro-6-dehydro-17α-hydroxyprogesterone, 6-chloro-6-dehydro-17α-hydroxyprogesterone, 6-bromo-6-dehydro-17α-hydroxyprogesterone, 6-methyl-6-dehydro-17α-hydroxyprogesterone, 1,6-bis-dehydro-17α-hydroxyprogesterone, 6-fluoro-1,6-bis-dehydro-17α-hydroxyprogesterone, 6-chloro-1,6-bis-dehydro-17α-hydroxyprogesterone, 6-bromo-1,6-bis-dehydro-17α-hydroxyprogesterone and 6-methyl-1,6-bis-dehydro-17α-hydroxy-progesterone.

Example XXII

A solution of 1 g. of 9α,11β-dichloro-17α-acetoxy-progesterone in 30 cc. of methanol was treated with 175 mg. of potassium hydroxide previously dissolved in 0.2 cc. of water and 2.5 cc. of methanol and the mixture was refluxed for 2 hours under an atmosphere of nitrogen; it was then neutralized with acetic acid and the solvent evaporated almost to dryness under vacuum. Water was added and the formed precipitate collected by filtration, washed with water and dried. Crystallization from acetone-ether gave the pure 9α,11β-dichloro-17α-hydroxyprogesterone.

In a similar manner 6α,9α,11β-trichloro-17α-acetoxy-progesterone, 6α-fluoro-9α,11β-dichloro-17α-acetoxy-1-dehydro-progesterone, 6α-methyl-9α,11β-dichloro-17α-acetoxy-progresterone, 9α,11β-dichloro-1,6-bisdehydro-17α-acetoxy-progesterone and 6-methyl-6-dehydro-17α-propionoxy-progesterone were converted into the corresponding free compounds.

I claim:

1. A compound of the following formula:

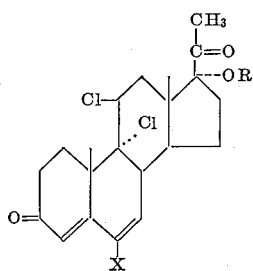

wherein X is selected from the group consisting of hydrogen, methyl, fluorine, chlorine and bromine and R is a hydrocarbon carboxylic acyl group of less than 12 carbon atoms.

2. The hydrocarbon carboxylic acid esters of less than 12 carbon atoms of 9α,11β-dichloro-6-dehydro-17α-hydroxyprogesterone.

3. The hydrocarbon carboxylic acid esters of less than 12 carbon atoms of 6-methyl-9α,11β-dichloro-6-dehydro-17α-hydroxyprogesterone.

4. The hydrocarbon carboxylic acid esters of less than 12 carbon atoms of 6-fluoro-9α,11β-dichloro-6-dehydro-17α-hydroxyprogesterone.

5. The hydrocarbon carboxylic acid esters of less than 12 carbon atoms of 6-bromo-9α,11β-dichloro-6-dehydro-17α-hydroxyprogesterone.

6. The hydrocarbon carboxylic acid esters of less than 12 carbon atoms of 6,9α,11β-trichloro-6-dehydro-17α-hydroxyprogesterone.

7. A compound of the following formula:

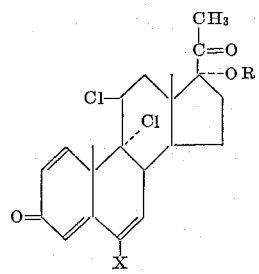

wherein X is selected from the group consisting of hydrogen, methyl, fluorine, chlorine and bromine and R is a hydrocarbon carboxylic acyl group of less than 12 carbon atoms.

8. The hydrocarbon carboxylic acid esters of less than 12 carbon atoms of 9α,11β-dichloro-1,6-bisdehydro-17α-hydroxy progesterone.

9. The hydrocarbon carboxylic acid esters of less than 12 carbon atoms of 6-fluoro-9α,11β-dichloro-1,6-bisdehydro-17α-hydroxy progesterone.

10. The hydrocarbon carboxylic acid esters of less than 12 carbon atoms of 6-bromo-9α,11β-dichloro-1,6-bisdehydro-17α-hydroxy progesterone.

11. The hydrocarbon carboxylic acid esters of less than 12 carbon atoms of 6-methyl-9α,11β-dichloro-1,6-bisdehydro-17α-hydroxy progesterone.

12. The hydrocarbon carboxylic acid esters of less than 12 carbon atoms of 6,9α,11β-trichloro-1,6-bisdehydro-17α-hydroxy progesterone.

References Cited by the Examiner
UNITED STATES PATENTS 2,894,963   7/1959   Gould et al. _____ 260—397.45

OTHER REFERENCES

Bergstrom et al.: J. Org. Chem., vol. 25, pages 1263–65 (1950).

Reimann et al.: J.A.C.S., vol. 82, pages 2308–11 (1960).

Ringold et al.: J.A.C.S., 81, pages 3485–86 (1959).

Robinson et al.: J.A.C.S., vol. 81, pages 2191–95 (1959).

Robinston et al.: J.A.C.S., vol. 82, pages 4611–14 (1960).

LEWIS GOTTS, *Primary Examiner.*

L. H. GASTON, MORRIS LIEBMAN, *Examiners.*